3,318,235
HYDRAULIC PRESS BRAKE
Eduard Hänni, Rosengartenstrasse 10,
Zofingen, Switzerland
Filed Oct. 12, 1964, Ser. No. 403,106
Claims priority, application Austria, Oct. 18, 1963,
A 8,376/63
4 Claims. (Cl. 100—257)

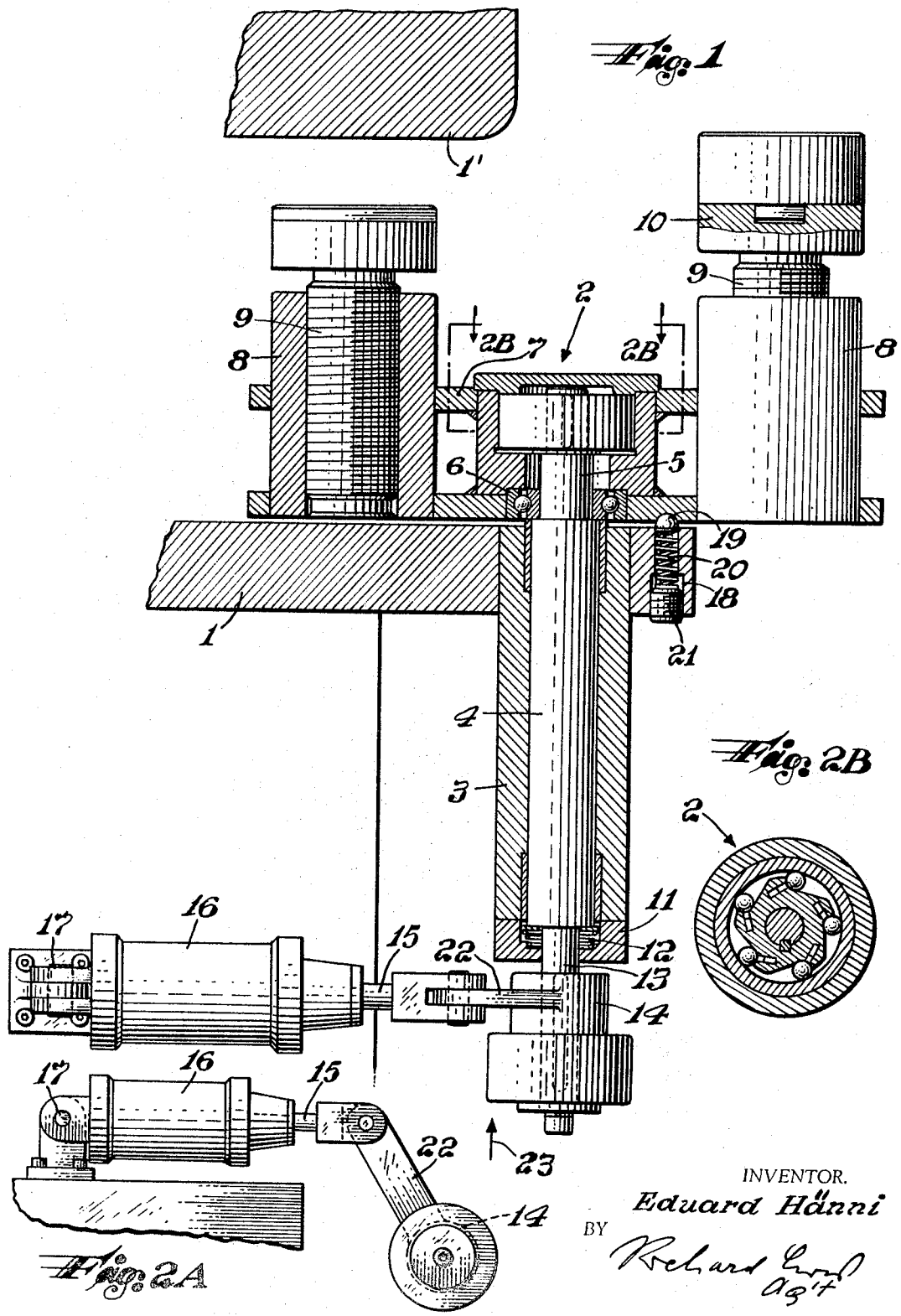

This invention concerns a hydraulic press brake which has adjustable stops.

The lowest position of the ram in a press is conventionally limited by rigid stops. The stops require adjustment for each stroke when working pieces having a plurality of different offsets. In order to be able to set up the work pieces in a series of consecutive operations, rapid changes in the position of the stops are necessary.

It is an object of the present invention to provide a press brake with adjustable stops in which the stops may be adjusted according to a pre-arranged program.

According to the present invention a hydraulic press is provided with a set of stops at each end of the press table which can be adjusted and selectively and individually brought into and out of the working position.

The stops are arranged on a revolving head at each end of the table.

The features and objects of the invention will be further apparent from the following description with reference to the accompanying drawings in which:

FIG. 1 shows the part of a press brake carrying the stop arrangement of the invention in an elevational section;

FIG. 2A is an elevation view in the direction of the arrow 23 in FIG. 1; and

FIG. 2B is a section taken in the plane of the line 2B—2B of FIG. 1.

The table 1 of a hydraulic press brake having a ram 1' is equipped at each end with a revolving head 2 (only one such head being shown in the drawing). The revolving head 2 is provided with a bearing sleeve 3 in which a shaft 4 is received.

The shaft 4 has a reduced portion 5 on which the stop carrier 7 of the revolving head 2 is rotatably mounted by means of ball bearings 6 (see FIG. 2B). Stop assemblies distributed about the periphery of the carrier 7 each consist of a spindle casing 8 and a spindle 9 threadedly arranged therein. Each spindle 9 carries a stop 10. When the spindle 9 is turned in the casing 8, the vertical position of the stop 10 can be accurately adjusted. The arrangement is such that stepwise rotation of the revolving head 2 causes a single stop to be aligned with the ram 1'.

The lower end of the bearing sleeve 3 carries a cover 11. A spring 12 is disposed in the cover and urges the shaft 4 and the carrier 7 to move upward. An extension 13 of the shaft 4 projecting downwardly from the sleeve 3 carries a free-wheeling coupling 14 which is connected by a link 22 to the piston rod 15 of a piston (not shown) in a pneumatic cylinder 16, as can be seen from FIG. 2A. The cylinder is mounted on a pivot 17.

From FIG. 2A it will be clear that the link 22 acts as a swinging arm and transmits motion to the coupling 14 during the forward strokes of the piston rod 15 while the coupling is permitted to run freely during the return strokes of the piston rod. The coupling 14 may be formed, for instance, as a ratchet wheel.

A locking ball 19 is arranged in a bore 18 of the table 1 under the pressure of a spring 20. The spring 20 abuts against a closure member 21 in the bore 18 and urges the ball against the carrier 7 which has depressions radially aligned with the spindle casings 8.

The individual stops 10 are adjusted according to the program to be carried out, and the revolving head is indexed after each working stage by the piston rod 15 and the pneumatic cylinder 16 until the ball 19 engages a depression in the carrier 7. The spring 12 holds the revolving head 2 away from the table 1 during its rotation. During the return stroke of the piston rod 15, the coupling 14 freewheels.

What I claim is:
1. In a press, in combination:
   (a) a press table;
   (b) a ram movable toward and away from said table in a predetermined direction;
   (c) a carrier mounted on said table for rotation about an axis extending in said direction;
   (d) a plurality of stops;
   (e) securing means securing said stops to said carrier for axial adjustment thereon, said stops being spacedly arranged about the periphery of said carrier for movement toward and away from respective positions of alignment with said ram in said direction when said carrier rotates about said axis; and
   (f) means for indexing said carrier about said axis.
2. In a press as set forth in claim 1, said securing means including engaged threads on said carrier and on each stop.
3. In a press as set forth in claim 1, said means for indexing the carrier including a shaft fixedly fastened to said carrier, free-wheeling coupling means on said shaft, and a pressure-fluid operated reciprocating motor connected to said shaft by said coupling means.
4. In a press as set forth in claim 3, bearing means interposed between said table and said carrier in said direction, and yieldably resiliently means axially biasing said carrier away from said table.

References Cited by the Examiner

UNITED STATES PATENTS

| 1,677,471 | 7/1928 | Friederici | 72—441 |
| 3,100,438 | 8/1963 | Merker | 100—257 X |
| 3,126,045 | 3/1964 | Streit | 72—441 X |

FOREIGN PATENTS 548,620   11/1957   Canada.

BILLY J. WILHITE, *Primary Examiner.*

WALTER A. SCHEEL, *Examiner.*